(12) United States Patent
Borgmann et al.

(10) Patent No.: US 12,239,044 B2
(45) Date of Patent: *Mar. 4, 2025

(54) CONVERGING ROW UNIT FOR POTATO PLANTER

(71) Applicant: Spudnik Equipment Company LLC, Blackfoot, ID (US)

(72) Inventors: Rainer Borgmann, Idaho Falls, ID (US); Evan Steel, Blackfoot, ID (US); Jason Steinkamp, Blackfoot, ID (US); Henrik Wulferding, Ehrenburg (DE)

( * ) Notice: Subject to any disclaimer, the term of this patent is extended or adjusted under 35 U.S.C. 154(b) by 724 days.

This patent is subject to a terminal disclaimer.

(21) Appl. No.: 17/093,295

(22) Filed: Nov. 9, 2020

(65) Prior Publication Data

US 2021/0137000 A1 May 13, 2021

Related U.S. Application Data

(63) Continuation-in-part of application No. 16/679,975, filed on Nov. 11, 2019, now Pat. No. 11,612,100.

(51) Int. Cl.
*A01C 9/02* (2006.01)
(52) U.S. Cl.
CPC ..................................... *A01C 9/02* (2013.01)
(58) Field of Classification Search
CPC .. A01C 9/02; A01C 9/00; A01C 7/127; A01C 7/12; A01C 7/08; A01C 7/00; A01C 7/20
See application file for complete search history.

(56) References Cited

U.S. PATENT DOCUMENTS

| 2,589,762 | A | 3/1952 | Barnett et al. |
| 2,609,969 | A | 9/1952 | Epps |
| 4,193,357 | A | 3/1980 | Freeman et al. |
| 5,402,741 | A | 4/1995 | Traux et al. |
| 11,612,100 | B2 * | 3/2023 | Borgmann ............... A01C 9/02 111/171 |
| 2006/0283363 | A1 | 12/2006 | Wollman et al. |

FOREIGN PATENT DOCUMENTS

| DE | 1782151 | 7/1971 |
| DE | 2214134 | 9/1973 |

OTHER PUBLICATIONS

PCT/US20/60039 Int'l. Search Report and Written Opinion, Feb. 10, 2021.

* cited by examiner

*Primary Examiner* — Christopher J. Novosad
(74) *Attorney, Agent, or Firm* — Progress Patent Law, PLLC; David R. McKinney

(57) ABSTRACT

A converging row unit for planting seed potatoes includes a plurality of linear arrays of seed cups, each array disposed upon a flexible endless belt and having an upwardly moveable portion and a downwardly moveable portion. The upwardly moveable portion passes through a seed pick region wherein each seed cup can draw a seed, while the downwardly moveable portion progresses to a point of discharge of the seed. The linear arrays are laterally spaced apart from each other in the upwardly moveable portion, and converge together in the downwardly moveable portion, toward to the point of discharge.

17 Claims, 10 Drawing Sheets

CONVERGING ROW UNIT FOR POTATO PLANTER

PRIORITY CLAIM

The present application is a continuation-in-part of U.S. patent application Ser. No. 16/679,975, filed on Nov. 11, 2019, the contents of which are incorporated by reference herein in their entirety.

BACKGROUND

Field of the Invention

The present invention relates generally to systems for planting seed potatoes. More particularly, the present invention provides a converging row unit for a seed potato planting system, having multiple arrays of seed cups that pick up seed potatoes separately, then converge to drop the seeds in a single line in a furrow.

Related Art

Many seed potato planting devices employ a belt or chain with a series of cups disposed along their length. Each cup picks up a seed potato (i.e. a cut portion of a potato) from a seed potato supply hopper as the belt or chain passes therethrough, and directs the seed potato up over a top pulley and into a downwardly oriented chute, through which the seed potato is discharged for planting. While the belt or chain turns over at the top, the seed potatoes do not emerge from the bottom of the chute out of order because they are blocked by the preceding cup.

One common challenge associated with cup-type planters is the problem of mis-picks. On occasion, an individual cup along the belt or chain will fail to secure a seed potato from the hopper—called a "mis-pick"—or the potato seed piece can fall out of the cup. This creates a "skip" in the row, where no seed is planted in a given location. When skips occur, less seed is planted in the field, which will decrease the crop yield.

In agriculture, as in other industries, it is generally desirable to increase the speed of operations where possible. This is true of planting speed. Unfortunately, the frequency of mis-picks tends to increase when planting speeds increase. One approach for increasing planting speeds when using cup-type planting devices is to reduce the spacing of the cups on the belt or chain, allowing the same seed spacing while the planting vehicle travels at a higher rate of speed. However, a reduced spacing of cups tends to reduce the pick accuracy, increasing the frequency of mis-picks.

To address this issue, seed planting row units with multiple belts per row or belts having two rows of cups have been developed. However, known systems of this type tend to result in lower accuracy of placement of the seeds in the furrow, since both belts cannot be located in exactly the same space, and thus are each displaced some distance from a point right above the furrow.

The present application seeks to address one or more of the above-referenced issues.

SUMMARY

It has been recognized that it would be advantageous to have a cup-type planter device that allows faster planting of seed potatoes while minimizing mis-picks.

It has also been recognized that it would be advantageous to have a cup-type planter device that allows accurate placement of seeds in a furrow at a relatively high speed.

In accordance with one embodiment thereof, the present invention provides a converging row unit for planting seed potatoes, having a plurality of linear arrays of seed cups, each array disposed upon a flexible endless belt and having an upwardly moveable portion and a downwardly moveable portion. The upwardly moveable portion passes through a seed pick region wherein each seed cup can draw a seed, while the downwardly moveable portion progresses toward a combined point of discharge of the seed. The linear arrays are laterally spaced apart from each other in the upwardly moveable portion and converge together in the downwardly moveable portion, toward the combined point of discharge.

In accordance with another aspect thereof, the invention provides a converging row unit for planting seed potatoes, having a first endless belt, with a first linear array of seed cups attached thereto at a common linear spacing, and a second endless belt, having a second linear array of seed cups attached thereto at the common linear spacing. The first and second endless belts each have upwardly moveable portions that pass through first and second seed pick regions, wherein each seed cup can draw a seed, and downwardly moveable portions that progress to a point of discharge of the seed. The first and second endless belts have a common travel direction and spatially converge in the downwardly moveable portion, whereby the seed cups of the first and second linear arrays become alternately interleaved together in the downwardly moveable portion to effectively provide a single converged linear array of seed cups at half the common linear spacing, extending to the point of discharge.

In accordance with yet another aspect thereof, the invention provides a converging row unit for planting seed potatoes, having a single flexible endless belt with first and second side edges, a first linear array of seed cups, attached to the single endless belt near the first side edge, and a second linear array of seed cups, attached to the single endless belt near the second side edge. The first and second linear arrays have a lateral spacing therebetween and a staggered linear spacing of seed cups. The single endless belt has an upwardly moveable portion that passes through a seed pick region, wherein each seed cup can draw a seed, and a downwardly moveable portion that progresses to a point of discharge of the seed. The single endless belt has an open configuration within the upwardly moveable portion, and an inwardly folded configuration in the downwardly moveable portion, the inwardly folded configuration characterized by the seed cups of the first and second linear arrays being alternately interleaved together in a single converged linear array extending to the point of discharge.

In accordance with yet another aspect thereof, the invention provides a method for planting seed potatoes. The method includes drawing a first seed potato from a seed supply with a first seed cup array of a converging row unit, drawing a second seed potato from a seed supply with a second seed cup array of the converging row unit, then bringing the first and second seed cup arrays together into a single converged linear array and directing the converged linear array to a discharge point. The method further includes discharging the first and second seed potatoes from the converged linear array at the discharge point, and separating the first and second seed cup arrays from the converged linear array.

BRIEF DESCRIPTION OF THE DRAWINGS

Additional features and advantages of the invention will be apparent from the detailed description which follows, taken in conjunction with the accompanying drawings, which together illustrate, by way of example, features of the invention, and wherein.

DETAILED DESCRIPTION

Reference will now be made to exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

As used herein, positional and directional terms, such as "forward," "backward," "front," "back," "top," "bottom," "above," "below," "in," "out," "up," "down," and the like, are to be interpreted relative to the respective illustrations in the drawings. These terms have specific reference to directions relative to the drawings, and are used for the purpose of description in connection with the drawings only, and do not necessarily indicate a specific direction, position or orientation relative to any other thing or any other positional or directional reference system, unless otherwise indicated. Those of skill in the art will recognize that the apparatus described herein may be used or described in a variety of orientations in which positional and directional terms could be used differently.

Figure 1:
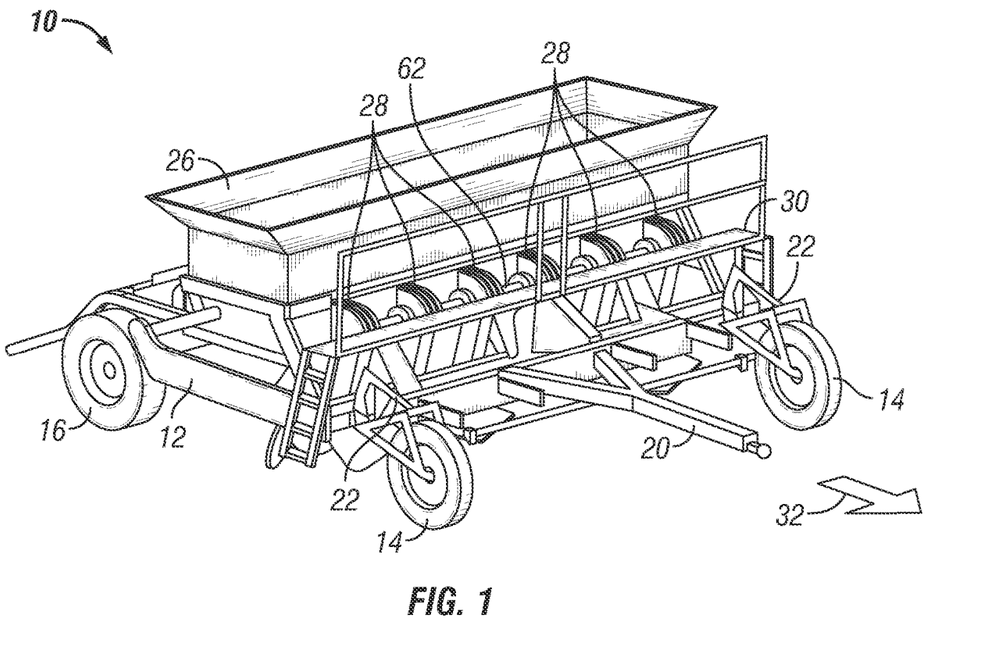
FIG. 1 is a front perspective view of a potato seed planter.

Shown in FIG. 1 is a perspective view of a planter 10 for planting seed potatoes. The planter 10 generally includes a main frame 12 with forward wheels 14 and rear wheels 16 for supporting the planter on the ground 18. The wheels 14, 16 are positioned with a spacing to ride between crop rows (not shown), and typically include low pressure tires to allow the planter to ride upon soft ground. A hitch or drawbar 20 is attached to the forward portion of the frame 12 to allow the planter to be towed behind a towing vehicle, such as a tractor (not shown). Hydraulic lift cylinders 22 can be attached to the rear axle assemblies and to the drawbar 20, allowing an operator to raise the entire machine for transporting the planter 10 on roads or turning around at the end of crop rows.

Attached to the main frame 12 is a seed dispensing assembly, which generally includes a main seed hopper 26, having a series of row units 28 extending downward and spaced at row-width intervals across the width of the hopper 26. Those of skill in the art will recognize that the number and spacing of the row units 28, can vary, depending on the selected crop row width and number of rows that a single planter is intended to cover. The planter embodiment shown in FIG. 1 is configured as a 6 row planter, but other sizes and configurations can also be produced. A transverse catwalk 30 is attached to the main hopper 26, allowing workers to monitor the dispensing of seeds from the hopper and to gain access to the hopper for refilling, maintenance, etc. In the figures, the direction of operation of the planter, the planting direction, is indicated by arrow 32 (FIGS. 1, 2), and the term "forward" has reference to the planting direction 32, while "backward" relates to the opposite direction. Similarly, the terms "front" and "rear" have reference to the planting direction 32, with a rear view being a view of structure on a side facing away from the planting direction 32, and a front view being a view of structure on a side facing toward the planting direction 32.

Figure 2:
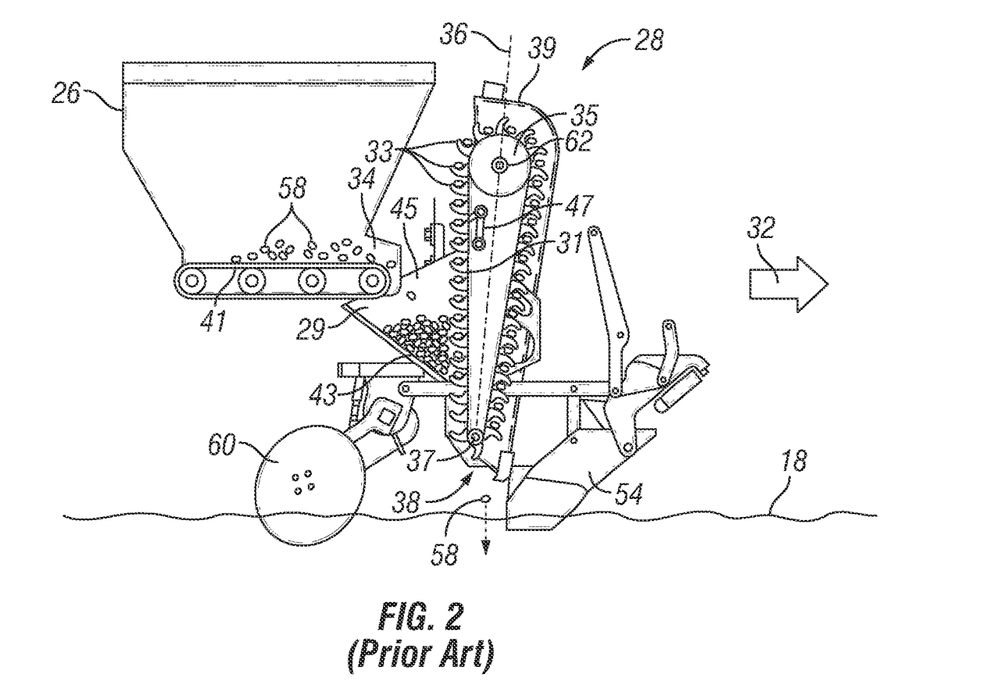
FIG. 2 is a partial side, cross-sectional view showing the inner workings of a prior art row unit.

Shown in FIG. 2 is a partial side, cross-sectional view showing the inner workings of the main hopper 26 and one row unit 28. The row units 28 are cup-type row units, which are attached near the main hopper 26 at each of multiple discharge locations of the main hopper. The row units 28 are oriented with a generally upright dispenser axis 36, and have a seed bowl 29 positioned to receive seed potatoes 58 from the discharge 34 of the main hopper 26. The row units 28 include an "endless" cup belt or chain 31 having a plurality of cups 33 positioned along its length at regular intervals, and disposed over an upper pulley 35 and a lower pulley 37. It is to be appreciated that the type of seed potato planter disclosed herein can use either belts or chains. Accordingly, unless specifically noted otherwise, the terms "belt" and "chain" can be used interchangeably herein, whether the actual apparatus depicted is a belt or a chain, and the use of one of these terms in the claims is intended to include the other. The cup belt 31 moves generally vertically within the row unit housing 39 as driven by the pulleys 35, 37, which rotate in a clockwise direction (in the view of FIG. 2), drawing seed potatoes 58 up, out of the seed bowl 29, around the top of the row unit 28, and discharging them through a seed discharge 38 at the bottom of the row unit 28. Disposed below the row unit 28 are a planting shoe 54 and cover disc 60, which are attached to the planter 10 and/or the row unit 28. The planting shoe 54 plows a furrow into the ground for receiving the seed potato 58 (ahead of the region of the discharge 38), and the cover disc 60 follows to push dirt over the seed 58, to complete the planting process.

The main hopper 26 and row unit 28 can include various devices and systems for facilitating smooth and consistent operation, and to prevent doubles, triples and skips, only some of which are shown herein. For example, the row unit 28 can include a seed bowl shaker 43 to help keep the seeds separate and flowing, and a seed bowl sensor 45 to sense the depth of seeds 58 in the seed bowl 29. A belt shaker device 47 can also be provided to shake the belt 31 to singulate the seeds 58. These various systems and their operation can be integrated with a computer control system (not shown) to optimize the speed and accuracy of planting. The row units 28 are thus configured to controllably receive and dispense individual seeds from the hopper 26 and drop the seeds from the seed discharge 38 below the frame 12.

Mechanical operation of the row units 28 (e.g. rotation of the upper pulley 35) can be provided through a common row unit drive shaft 62 that connects to the upper pulleys 35 of all row units 28 on the planter. The drive shaft 62 can be mechanically driven by chains, sprockets, etc. that are mechanically attached to one or more of the wheels 14, 16 of the planter so that the speed of operation of the row units 28 can be kept directly proportional to the speed of the planter 10, so that seed drops occur at a desired spacing. Alternatively, the drive shaft 62 can be driven by a motor (e.g. a hydraulic or electrical motor, not shown) that is coupled to a controller (e.g. a computer controller, not shown), and systems for sensing the speed of the wheel(s) 14, 16, can also be coupled to the controller, allowing the computerized system to adjust the speed of the row units 28 to match the speed of motion of the planter 10 or modify the drop rate in a desired manner. With either of these sorts of row unit control systems, the spacing of seed drops can be kept consistent, or can be programmable and adjustable according to preferences of the user.

It is to be appreciated that faster operations are generally desirable in many aspects of agriculture in order to reduce labor and other costs. However, simply increasing the speed of a planter (or other vehicle) may not have this desired effect. For example, as noted above, one common challenge associated with cup-type planters is the problem of mispicks, and this challenge is heightened when higher planting speeds are attempted. Referring again to FIG. 2, if the speed of the belt 31 is increased too much, the motion of the cups 33 through the seed supply 29 can exceed the ability of the seeds to fall into each cup as it passes through the seed supply 29, resulting in mis-picks. On the other hand, if the speed of the belt 31 is not increased but the spacing of the cups 33 is reduced, this can also result in mis-picks. A variety of approaches to this issue have been tried with some success, but it is believed that other solutions are desirable.

Advantageously, the system of the present disclosure promotes higher planting speeds by providing a converging row unit that includes multiple linear arrays of seed cups that converge together. In the embodiments shown herein, the converging row unit includes two linear arrays of seed cups, but it is not limited to two. The arrays of cups separately draw seeds from a seed supply (which can be a common seed supply or separate seed supplies), then converge together toward a discharge of the row unit to effectively reduce the longitudinal spacing of the cups without sacrificing pick accuracy of the separate linear arrays. This system can be configured in various ways, as described herein.

One embodiment of a converging row unit 128 for planting seed potatoes in accordance with the present disclosure is illustrated in FIGS. 3-6. In general, a converging row unit in accordance with the present disclosure includes first and second linear arrays of seed cups, disposed upon a flexible endless chain, which are initially separated, pick seed potatoes separately in a seed pick region, then converge prior to a discharge point, allowing a higher seed discharge rate. In the embodiment of FIGS. 3-6 the endless chain comprises a pair of flexible endless chains 110a, 110b, having a first linear array 112a of seed cups 114 attached to the first endless chain 110a, and a second linear array 112b of seed cups 114 attached to the second chain 110b.

Figure 3:
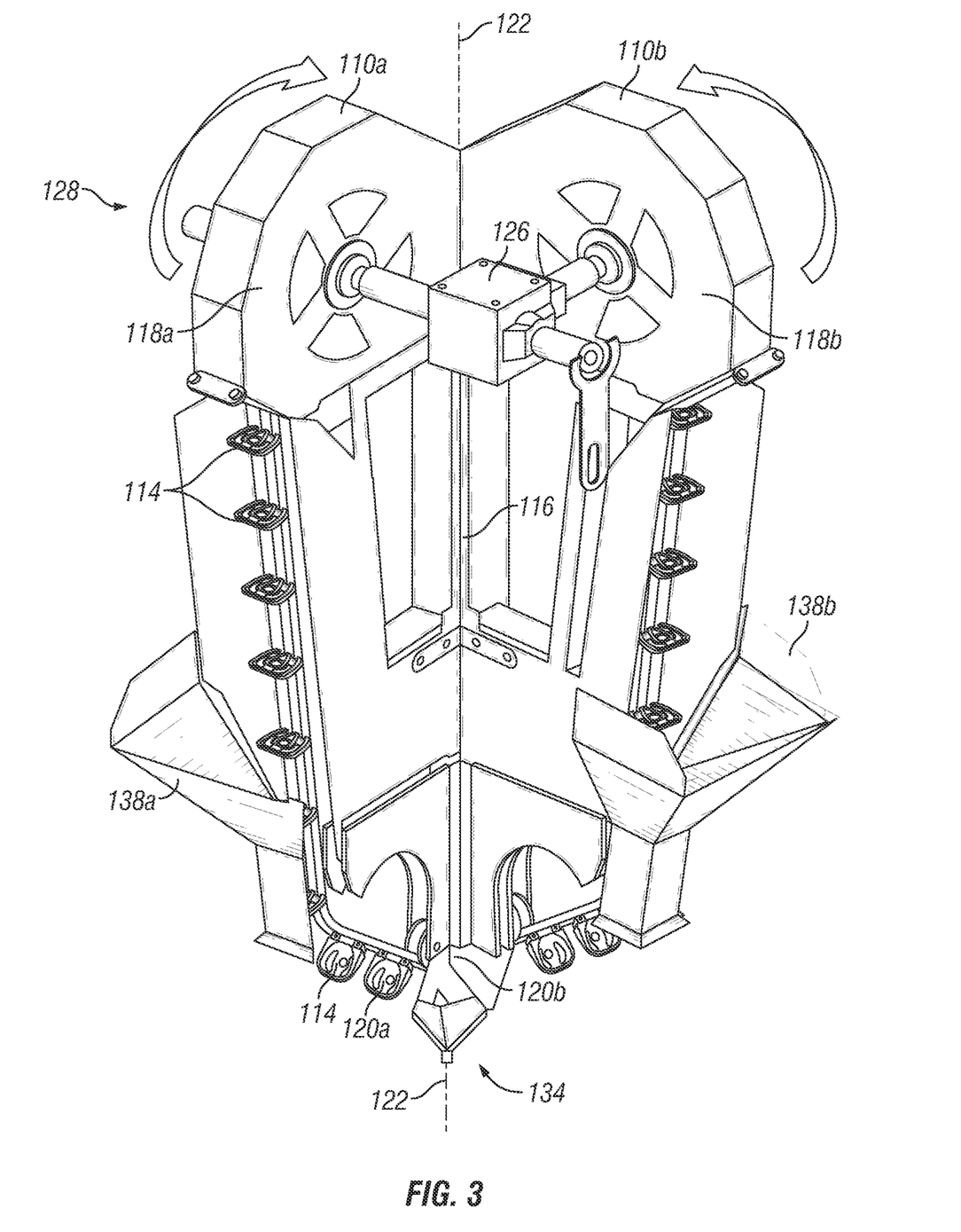
FIG. 3 is a rear perspective view of an embodiment of a converging row unit in accordance with the present disclosure.
Figure 4:
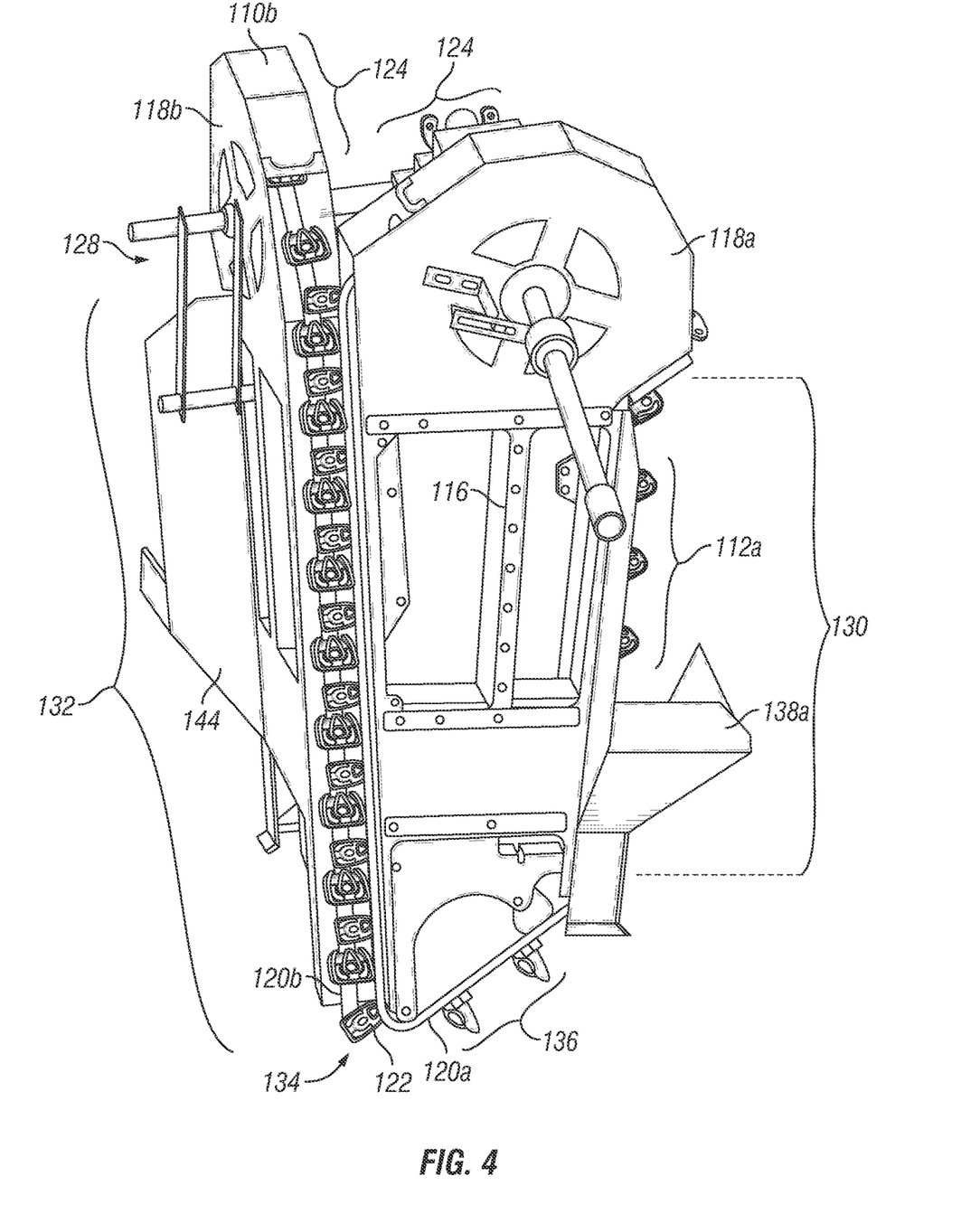
FIG. 4 is a front perspective view of the converging row unit of FIG. 3.
Figure 5:
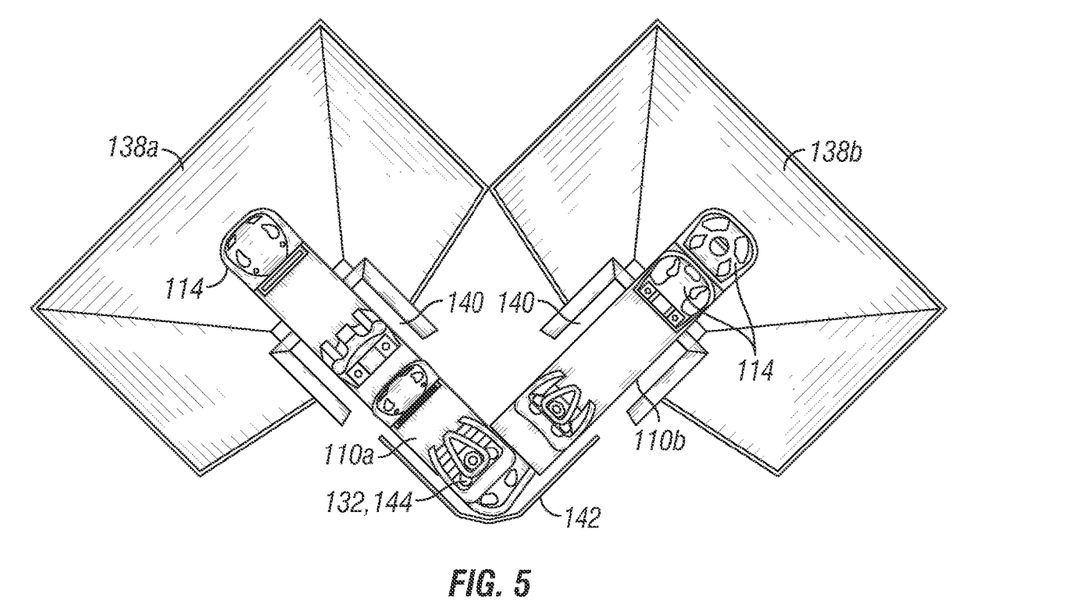
FIG. 5 is a top view of the converging chains of the converging row unit of FIGS. 3 and 4.

The row unit 128 generally includes an upright frame 116, with two sets of upper and lower pulleys 118a, b and 120a, b, attached to the frame 116. Each pair of pulleys 118, 120 are oriented in a substantially vertical plane and have one of the two endless chains 110 disposed around them. The first endless chain 110a is disposed around the first upper pulley 118a and the first lower pulley 120a, and the second endless chain 110b is disposed around the second upper pulley 118b and second lower pulley 120b. As best seen in FIGS. 3-5, the plane of the first pair of pulleys 118a, 120a is substantially perpendicular to the plane of the second pair of pulleys 118b, 120b, and the first and second vertical planes intersect generally along a line tangent to both the first and second upper and lower pulleys, indicated at 122 in FIGS. 3-4 and 6. The area where the chains 110 draw together as they pass over the upper pulley 118 is referred to herein as a converging region of the chains, indicated at 124. A gear box 126 is attached to the upper pulleys 118a, b of the converging row unit 128, and is configured to connect to a drive motor to drive the endless chains 110 of the unit.

Each chain 110 with its array of seed cups 114 has an upwardly moveable portion 130 facing toward the back of the row unit 128 (i.e. facing away from the planting direction), and a downwardly moveable portion 132 in the tangent region 122 on the front of the row unit 128. The upwardly movable portions 130 of the first and second chains 110a, b are laterally spaced apart from each other, but draw together in the converging region 124, and remain close together and generally parallel to each other in the downwardly moveable portion 132. A seed discharge 134 is located at the bottom of the downwardly moveable portion 132, in a diverging region 136 where the two chains 110 and their seed cups 114 separate from each other around their respective lower pulleys 120.

The row unit 128 includes a pair of seed hoppers 138a, b, each disposed around the respective upwardly moveable portion 130a, b of the chains 110a, b. The seed hoppers 138 are configured to contain a quantity of seed, and thus provide a seed pick region for each chain 110. Each hopper 138 has a belt opening 140 in its lower region, and the upwardly moveable portion 130 of the respective chain extends through the belt opening 140. Each chain 110a, b thus passes upwardly through its respective seed hopper 138a, b, allowing each seed cup 114 to draw a seed from the hopper 138.

Figure 6:
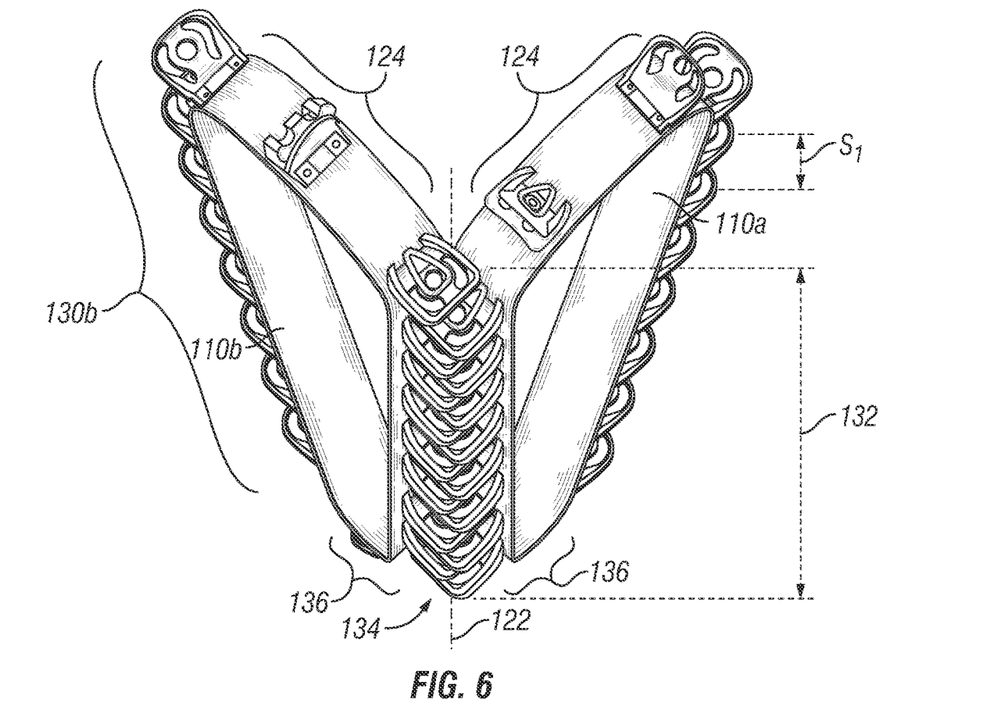
FIG. 6 is a front perspective view of the converging chains of the converging row unit of FIGS. 3 and 4.

As motion of the chain 110 continues, the chain travels up and over the respective upper pulley 118a, b, causing each seed cup 114 to also go over the upper pulley 118a, b, into the converging region 124 at the upper end of the downwardly moveable portion 132 of the chains 110. FIGS. 5 and 6 show the converging region 124 and downwardly moveable portion 132 of the chains 110 isolated from the row unit 128 as a whole. In the converging region 124, the cups 114 of the two chains 110a, b alternately interleave together into a single converged linear array 144 of cups in the downwardly moveable portion 132, to the point of discharge 134.

It is to be appreciated that as the chains 110 travel over their respective upper pulleys 118, the seed cups 114 will all turn over, allowing any seeds carried therein to fall from the cups. However, the seeds will naturally fall against the back of the preceding seed cup 114, thus being retained on the chain 110. Additionally, as shown in FIG. 5, the downwardly moveable portion 132 can be enclosed within a belt chute 142, which surrounds the converged chains 110, and prevents the seeds from falling away from the chains. Consequently, each seed will be contained within the chute 142 and between the cup 114 that drew it from the hopper 138 and the preceding cup (which will be below the drawing cup in the downwardly moveable portion 132), until reaching the discharge 134.

The first and second linear arrays 112a, b of seed cups 114 have a common linear or longitudinal spacing, indicated at $S_1$ in FIG. 6. The inventor believes that a spacing of about 5 inches to about 7 inches is suitable for good operation, but it is believed that other spacings can also be used. A linear spacing $S_1$ that is too small can result in an undesirable quantity of mis-picks when the chain is moving at or above a linear speed of about 100 ft/min.

The first and second chains 110a, b are offset in their vertical position on the respective chains relative to each other, so that the seed cups 114 will alternately interleave between each other within the converging region 124, without contacting or mechanically interfering with each other. Accordingly, the alternately interleaved cups 114 provide a converged series of cups in the downwardly moveable portion 132, effectively operating as a single converged linear array 144 having half the linear spacing of the individual arrays 112 on any one of the two chains 110. This allows the common linear spacing $S_1$ of the cups 114 on one of the individual chains 110 to be large enough to maintain accurate picking of seeds from the seed hoppers 138, while having an effective spacing of seed cups in the converged array 144 that is half the common spacing $S_1$, thus allowing faster seed discharge for a given speed of either of the individual chains 110.

Shown in FIGS. 7-12 is another embodiment of a converging row unit 228 in accordance with the present disclosure. This row unit 228 includes an upright frame 216, with upper and lower pulleys 218, 220 attached to the frame 216 and oriented in a substantially vertical plane, with a flexible endless belt 210 disposed around the upper and lower pulleys 218, 220. A drive motor (not shown) can be attached to the upper pulley 218 of the converging row unit 228, to drive the endless belt 210. In this embodiment the flexible endless belt 210 comprises a single endless belt that is relatively wide. The belt has an upwardly moveable portion 230 facing backward (i.e. away from the planting direction), and a downwardly moveable 232 portion on the front side of the row unit 228, which progresses to a point of discharge 234 at the lower end of the row unit 228.

Figure 11:
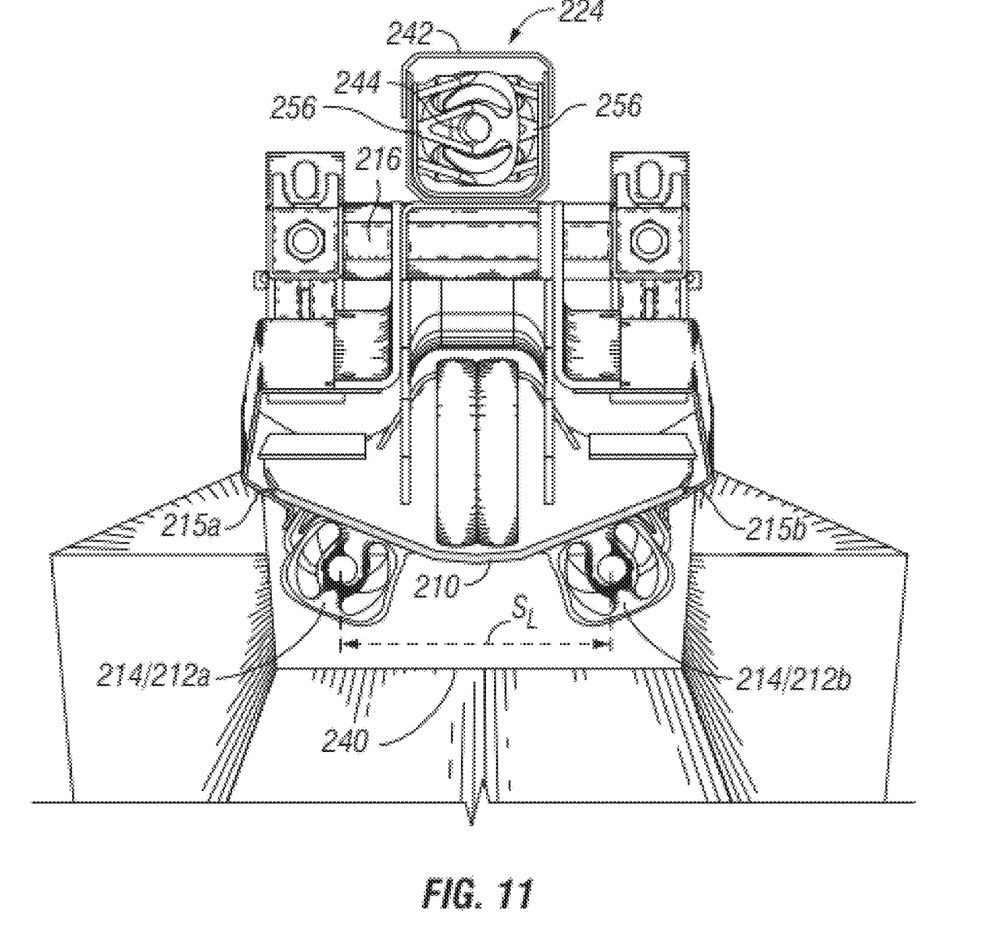
FIG. 11 is a top sectional view of the converging row unit taken along line 11-11 in FIG. 10, showing the configuration of the belt when passing through the hopper.

Attached to the belt 210 are two linear arrays 212a, b of seed cups 214. A first linear array 212a is attached to the wide belt 210 near a first side edge 215a of the belt, and a second linear array 212b is attached to the wide belt 210 near a second side edge 215b of the belt. The first and second linear arrays 212a, b have a maximum lateral spacing $S_L$ therebetween, as best shown in FIG. 11. The lateral spacing $S_L$ of the cups can vary. In one embodiment, the belt is about 12 inches wide and the lateral spacing $S_L$ is about 4.5 inches to about 6 inches.

Figure 7:
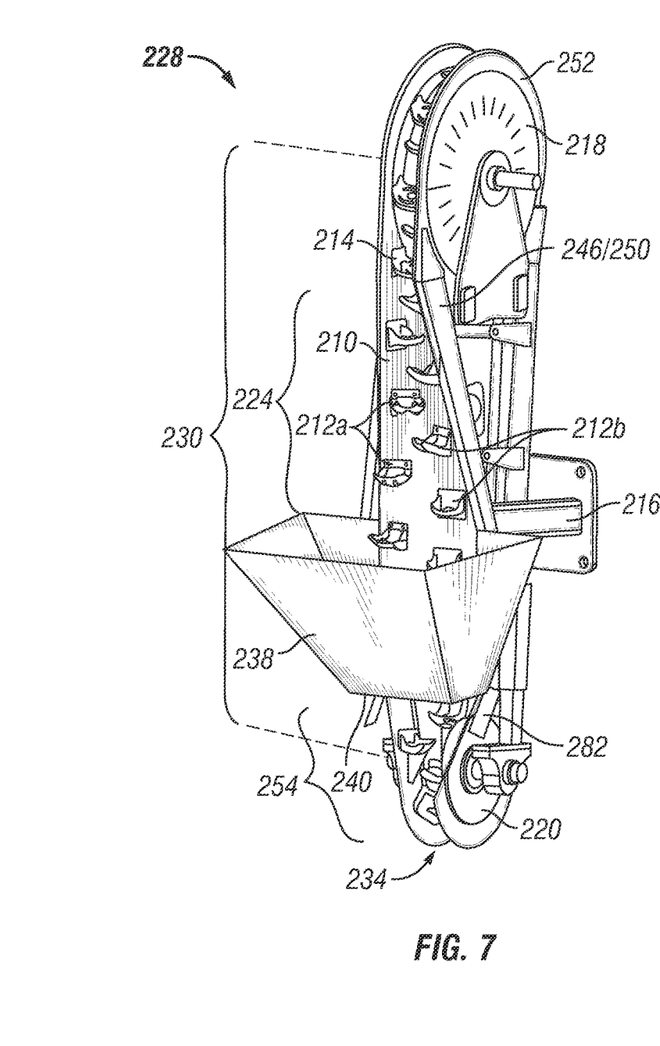
FIG. 7 is a rear perspective view of another embodiment of a converging row unit in accordance with the present disclosure.
Figure 10:
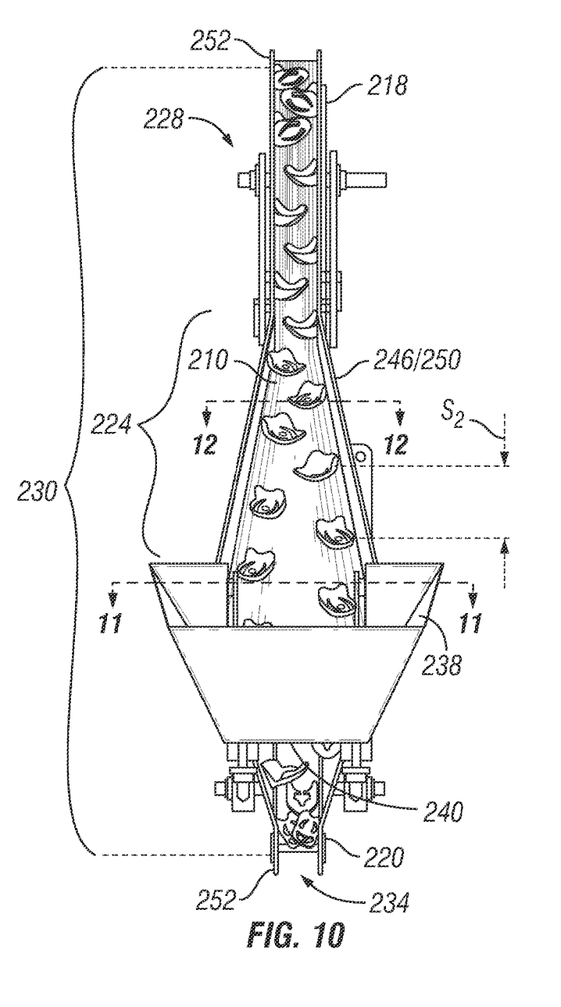
FIG. 10 is a rear view of the converging row unit of FIG. 7.

The first and second linear arrays 212a, b also have a linear or longitudinal spacing $S_2$ between adjacent cups 214, as best shown in FIG. 10. For good operation, the inventors have found that a linear or longitudinal spacing $S_2$ of about 5 to 7 inches is suitable for reliable operation of the seed picking function, though other spacings can also be used. Advantageously, as best seen in FIGS. 7 and 10, the relative positions of the first and second linear arrays 212a, b are vertically staggered or offset from each other. That is, the cups 214 in the two arrays 212 are at alternate vertical positions along the belt 210.

Viewing FIG. 11, the upwardly moveable portion 230 of the belt 210 is open and slightly convex in the region in which it passes upwardly through the seed hopper 238. In this configuration, because of the convex curvature of the belt, the seed cups 214 that are in a similar lateral position along the belt are pointed slightly away from each other, which helps improve their seed-picking ability. The hopper 238 is disposed around the upwardly moveable portion 230 of the belt 210 and is configured for holding a supply of seed potatoes, to provide a seed pick region. The hopper 238 has a belt opening 240 in its lower region, and the upwardly moveable portion 230 of the belt 210 extends through the belt opening 240 to allow each seed cup 214 to draw a seed from the supply in the hopper 238. Viewing FIGS. 9 and 11, the downwardly moveable portion 232, on the other hand, has an inwardly folded configuration in which the seed cups 214 of the first and second linear arrays 212a, b, are folded toward each other and interleaved together into a single converged linear array, indicated at 244.

Figure 8:
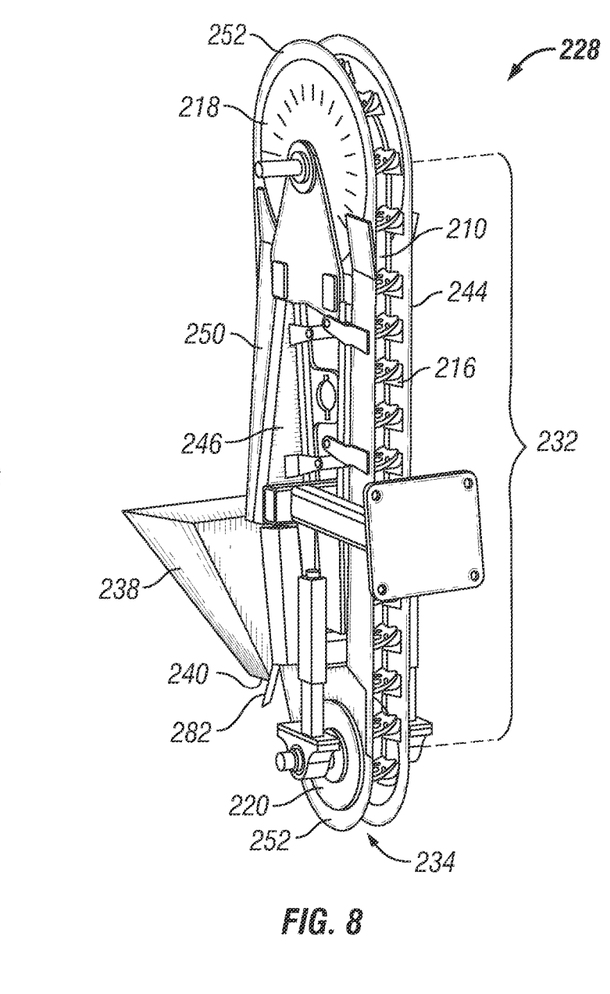
FIG. 8 is a front perspective view of the converging row unit of FIG. 7.
Figure 9:
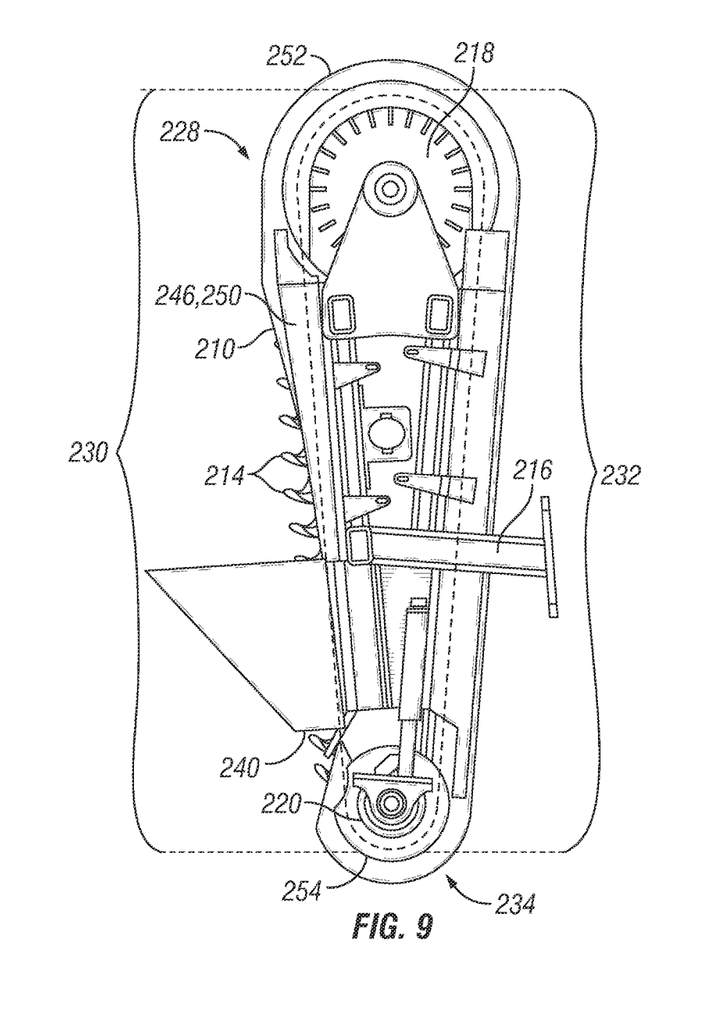
FIG. 9 is a side view of the converging row unit of FIG. 7.
Figure 12:
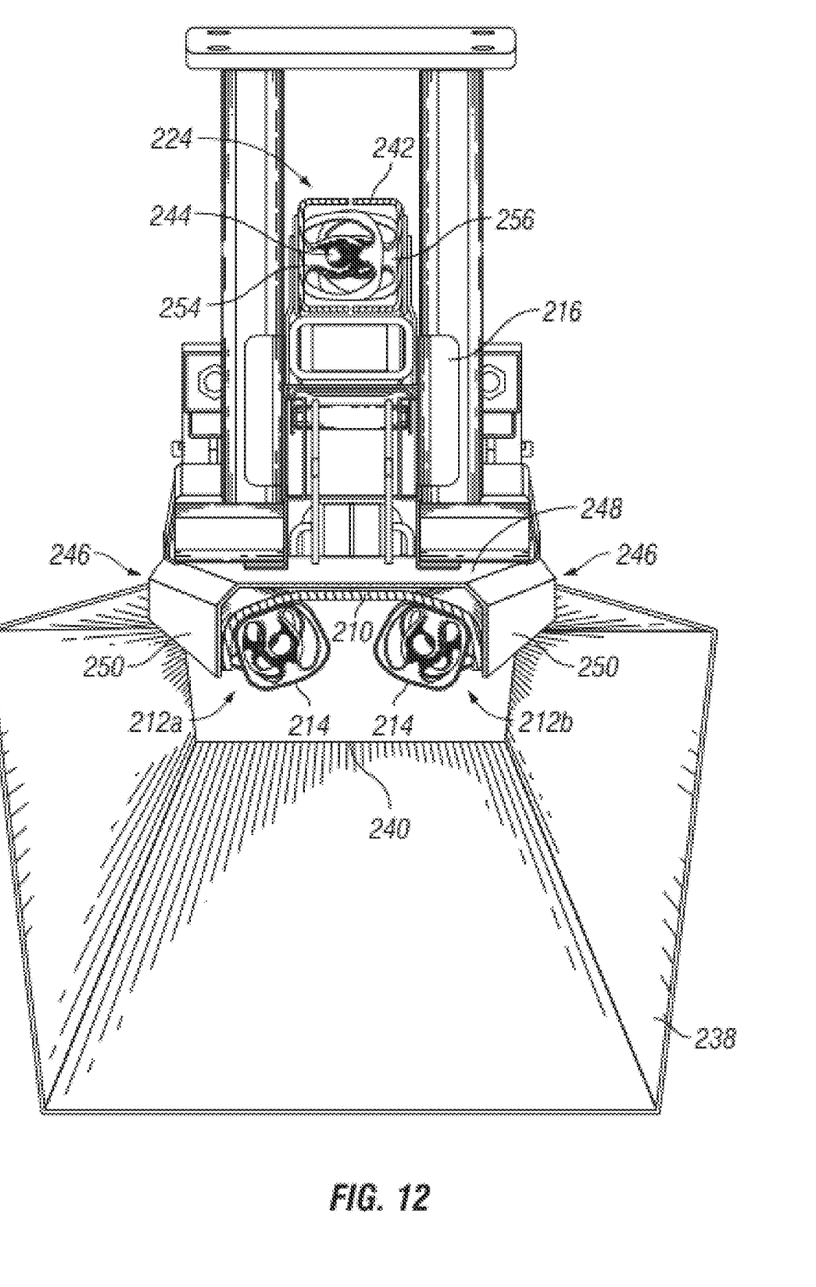
FIG. 12 is a top sectional view of the converging row unit taken along line 12-12 in FIG. 10, showing the belt passing through the converging guide.

The inwardly folded configuration is produced by the structure of the row unit 228 that guides and moves the belt 210. Viewing FIGS. 7, 8 and 12, positioned within the upper extent of the row unit 228, below the upper pulley 218, is a fixed converging guide 246, configured to transition the belt 210 from the open configuration to an inwardly folded configuration as the belt passes therethrough. The extent of the converging guide 246 defines a converging region for the belt. As shown in the cross-sectional view of FIG. 12, the converging guide 246 includes a back panel 248 that contacts the underside or back side of the belt 210 as it moves therepast. The back panel 248 is relatively wide at its lower end. At its upper end, however, as can be seen in FIGS. 7, 8 and 12, the back panel 248 is relatively narrow, with two side walls 250 extending generally perpendicularly from the back panel. This shape of the top of the converging guide provides an inwardly folded, generally U-shaped cross section. As the belt 210 passes through the converging guide 246, it is gradually folded inwardly into this U-shaped configuration as it approaches the upper pulley 218.

As can be seen in FIGS. 7-10, the upper and lower pulleys 218, 220 have side flanges 252, which also create a U-shaped cross-section similar to the shape of the upper end of the converging guide 246. This U-shaped cross-section maintains or holds the belt 210 in the inwardly folded configuration when in contact with the pulleys, as the belt traverses the upper and lower pulleys 218, 220. A diverging guide 282 (FIG. 7) can also be positioned between the lower pulley 220 and the lower extent of the upwardly moveable portion 230. The diverging guide 282 can be configured substantially the same as the converging guide 246, but in an inverted orientation, and defines a diverging region 254 for the belt. The diverging guide 282 can contact the back side of the belt 210 after its exit from the lower pulley 220, and facilitate the transition of the shape of the belt 210 from the inwardly folded configuration back to the slightly convex configuration as the belt passes therethrough.

The converging guide 246 and diverging guide 282, in conjunction with the side flanges 252 of the upper and lower pulleys 218, 220, provide a belt folding and unfolding mechanism. This mechanism draws the opposing lateral side edges 215a, b of the front face of the belt 210 together, to produce the single converged linear array 244, shown in perspective view in FIG. 8 and in cross-sectional view in FIGS. 11 and 12. This converged linear array 244 extends through the downwardly moveable portion 232. The diverging guide 282 and diverging region 254 allow the opposing sides (regions toward the opposing side edges 215a, b) of the front face of the belt 210 to unfold and separate after the belt 210 passes the discharge 234 and releases the seeds.

As with the embodiment shown in FIGS. 3-6, as the belt 210 travels over the upper pulley 218, the seed cups 214 will all turn over, potentially allowing the seeds to fall from the cups. However, the seeds from each cup 214 will naturally fall against the back of the preceding seed cup 214, which will help prevent the seeds from falling from the belt. Additionally, after emerging from the converging guide 246, the seed cups 214 are surrounded on three sides by the folded portions of the belt, as shown in the cross-sectional view of FIGS. 11 and 12. Additionally, the downwardly moveable portion 232 of the belt 210 is contained between side walls 256, which are attached to the frame 216 and have a spacing substantially like that of the flanges 252 of the pulleys 218 and 220, and the inwardly folded belt 210 is further enclosed within a belt chute 242, which completely surrounds the folded belt 210 and prevents the seeds that are between adjacent cups 214 from falling away from the belt 210. Consequently, each seed will be contained within the chute 242 and between the cup 214 that drew it from the hopper and the preceding cup 214, essentially within its own unique "chamber" until reaching the discharge 234.

At the discharge 234, the folded belt 210 emerges from the chute 242 and begins to turn around the lower pulley 220. This change in orientation of the belt and the loss of the blockage provided by the chute 242 sequentially opens each "chamber" along the converged array 244, thus allowing each seed to drop out.

As noted above, the first and second linear arrays 212a, b of cups 214 are staggered relative to each other, so that the seed cups 214 will alternately interleave with each other in the converging region 224, without contacting or mechanically interfering with each other. Accordingly, the converged linear array 244 of seed cups 214 effectively operates as a single linear array having half the linear spacing $S_2$ of the individual linear arrays 212. This allows the common linear spacing $S_2$ of the cups in each array to be large enough to promote accurate picking of seeds from the seed hopper, while having an effective spacing of seed cups in the converged array 244 that is half the common spacing, thus allowing faster seed discharge.

The embodiments of either FIG. 3-6 or 7-12 both provide a converging row unit for planting seed potatoes that includes spatially separated linear arrays of seed cups, each array disposed upon a flexible endless belt, which converge together into a single converged linear array extending to a point of discharge of the seed. Each array has an upwardly moveable portion that passes through a seed pick region, and a downwardly moveable portion that progresses to the point of discharge. In the upwardly movable portion each seed cup can draw a seed in the seed pick region, and is characterized by the first and second linear arrays being laterally spaced apart from each other. The downwardly moveable portion is characterized by the seed cups of the first and second linear arrays being alternately interleaved together into the converged linear array.

Whether the converging row unit includes multiple belts (as shown in FIGS. 3-6) or one belt (as shown in FIGS. 7-12), it can be used as part of a complete planter for planting seed potatoes. A potato seed planter with converging row units can be configured much like the planter shown in FIG. 1. Such a planter can include a frame 12 with wheels 14, 16, configured to be moved upon ground in a planting direction 32, with a main seed hopper 26, attached to the frame 12. The main hopper 26 can have a plurality of discharge devices, like the discharge device 34 in FIG. 2, with a converging row unit (e.g. row unit 128 or 228 in the place of each prior row unit 28) attached adjacent to one of the discharge devices 34. The converging row units receive seeds discharged from the main seed hopper 26, and transport them to their respective discharges (e.g. 134, 234) and drop the seeds onto the ground below the planter. Advantageously, the converging row unit embodiments disclosed herein can allow the planter to operate accurately at relatively high planting speeds.

Where a single belt converging row unit (like the row unit 228 of FIGS. 7-12) is used, a common drive motor (not shown) can be attached to a common drive shaft, shown at 62 in FIGS. 1 and 2, which is connected to drive all of the converging row units. Alternatively, each converging row unit, or some subset of all row units, can include its own drive motor (e.g. an electric or hydraulic motor). For example, the dual belt row unit 128 of FIGS. 3-6 can include a drive motor for each row unit (e.g. coupled to the common gear box 126 for each row unit).

The drive motor(s) can be configured to drive the converging row units (128, 228) at a speed that is proportional to a speed of the planter 10, so that the seeds are discharged from each converging row unit at a desired linear spacing along the ground. Additionally, or alternatively, the row units can be driven at independent speeds, such as to compensate for angled or curved planting row ends or a curving planting path, changes in soil condition, etc. This can be accomplished by driving the row units using a computerized controller (not shown), which can be provided with GPS or other position determining systems to allow independent adjustment of the seed drop rate from each row unit.

Figure 13:
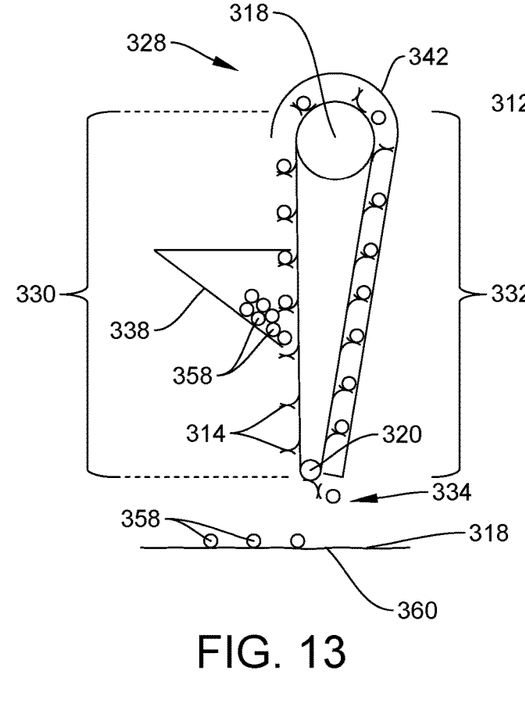
FIG. 13 is a partial side, cross-sectional view showing the inner workings of another embodiment of a converging row unit in accordance with the present disclosure.
Figure 14:
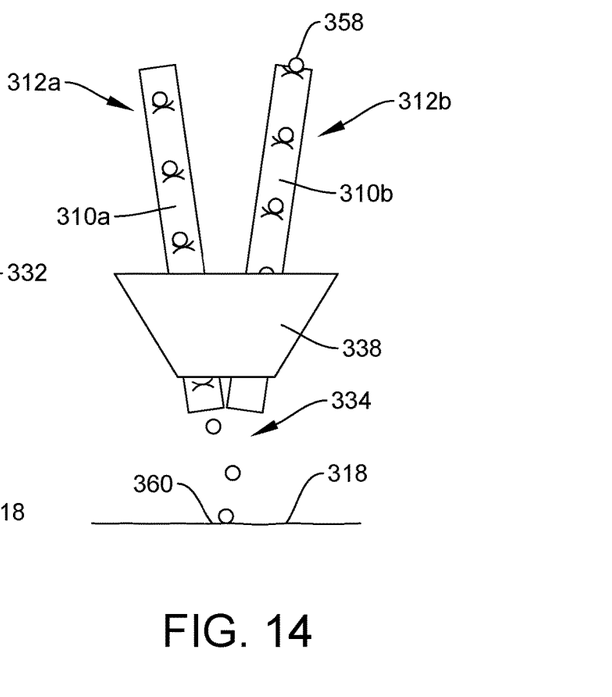
FIG. 14 is a rear view of the row unit of FIG. 13
Figure 15:
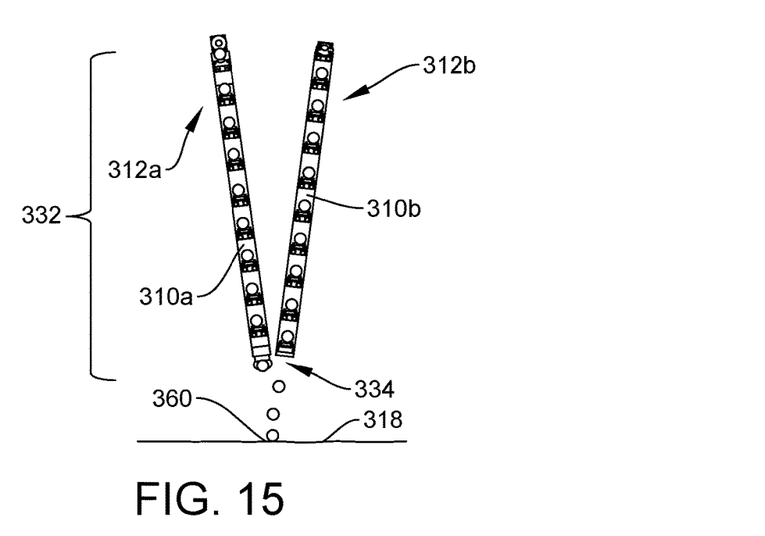
FIG. 15 is a front view of the converging belts of the row unit of FIGS. 13 and 14.

Another embodiment of a converging row unit 328 for planting seed potatoes is depicted in FIGS. 13-15. Like the embodiments previously discussed, this configuration includes a pair of linear arrays 312a, b of seed cups 314, each array 312 disposed upon a flexible endless belt 310 that is disposed around upper and lower pulleys 318, 320. Each belt has an upwardly moveable portion 330 that passes through a seed hopper 338, which provides a seed pick region in which each seed cup 314 can draw a seed 358. The flexible endless belts 310 also include a downwardly moveable portion 332 that progresses toward a point of discharge 334 of the seed. The downwardly moveable portion 332 can be housed within a chute 342, which prevents the seeds 358 from falling from their respective seed cup 314 during downward travel.

It is to be appreciated that the views of FIGS. 13-18 are somewhat conceptual in nature and are not as detailed as some other figures presented herein. Those of skill in the art will recognize that, though not shown, the embodiments in these figures will presumably include drive motors, shafts, frame elements and can include other compatible features that are depicted and described in connection with the other embodiments disclosed herein.

In the embodiment of FIGS. 13-15, the flexible endless belts 310 bearing the linear arrays 312 of seed cups 314 are laterally spaced apart from each other in the upwardly movable portion 330—that is, toward the upper end of the belts 310. In this embodiment, the endless belts 310 converge together in the downwardly moveable portion 332, toward a combined point of discharge 334, but the seed cups 314 of the two arrays do not interleave with each other. The seed cups 314 on the two endless belts 310 can be positioned at an alternate spacing, so that as the belts rotate around their lower pulley 320 they discharge seed potatoes alternately. This allows the pair of endless belts 310 to discharge seeds at a high rate operating together, while the individual belts can have a seed cup spacing that minimizes mis-picks, etc., as discussed above. The angle of orientation of the two endless belts 310 can be selected so that the seed potatoes 358 are discharged in a common direction to a substantially common landing point 360 on the ground 318.

Figure 16:
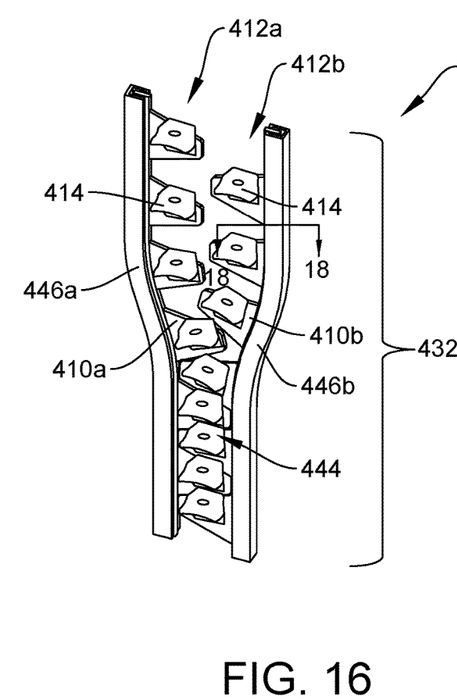
FIG. 16 is a partial front view of another embodiment of a converging row unit having side rails for controlling the lateral position of the endless belts.
Figure 17:
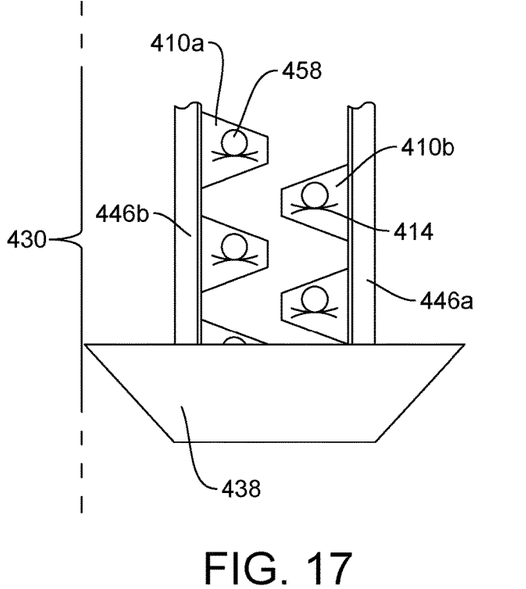
FIG. 17 is a partial rear view of the row unit of FIG. 16, showing the endless belts passing through the seed hopper.
Figure 18:
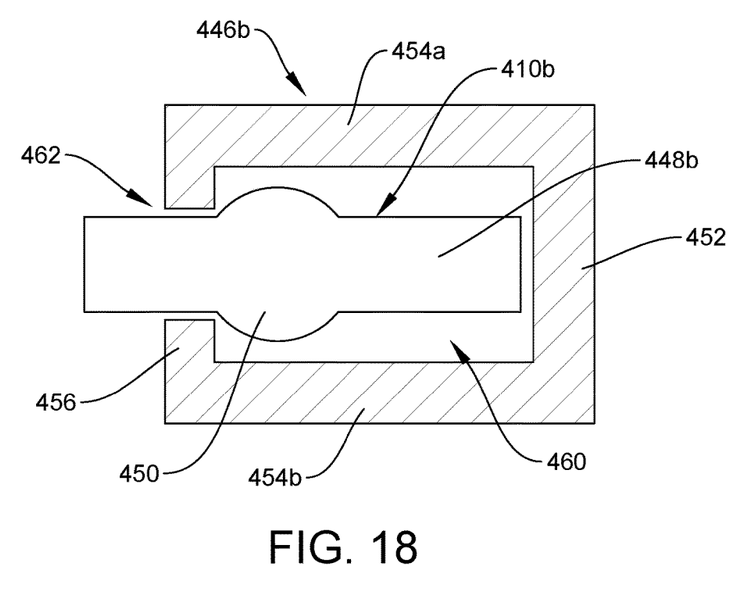
FIG. 18 is a cross-sectional view of one of the siderails of the row unit of FIG. 16.

Another embodiment of a converging row unit 428 for planting seed potatoes is depicted in FIGS. 16-18. Like the embodiments previously discussed, this configuration includes a pair of linear arrays 412a, b of seed cups 414, each array being disposed upon a flexible endless belt 410. Each belt 410 has an upwardly moveable portion 430 that passes through a seed hopper 438, which provides a seed pick region in which each seed cup 414 can draw a seed 458. The flexible endless belts 410 also include a downwardly moveable portion 432 that progresses toward a point of discharge (not shown in FIGS. 16-18) of the seed 458.

In the upwardly moveable portion 430, arrays 412 of seed cups 414 are laterally spaced apart, so that the seed cups 414 can accurately pick seeds from the seed hopper 438. However, in the downwardly moveable portion 432 the first and second endless belts 410a, b are directed toward each other and converge to alternately interleave the seed cups of the pair of linear arrays into a single converged linear array 444, as shown in FIG. 16. This is accomplished by the use of guide rails 446a, b, disposed on opposing lateral sides of the pair of endless belts 410 in the downwardly movable portion 432. Specifically, a first guide rail 446a slidingly engages an outward edge 448a of the first endless belt 410a, and a second guide rail 446b slidingly engages an outward edge 448b of the second endless belt 410b.

As shown in FIG. 16, the guide rails 446 are laterally spaced apart in the upper region of the downwardly moveable portion 432, and draw or converge toward each other as the belts 410 progress downward in the downwardly moveable portion 432, thereby laterally directing the first and second endless belts 410a, b toward each other to alternately interleave the seed cups 414 of the pair of linear arrays 412 into the single converged linear array 444 within the downwardly moveable portion 432.

A cross-sectional view of the second guide rail 446b and the outward edge 448b of the second flexible endless belt 410b is shown in FIG. 18. The endless belt 410b includes a bulge or rib 450 toward the outside edge 448b. The guide rail 446b has a box-like cross-sectional shape, with an outer sidewall 452, forward and rearward sidewalls 454a, b, and an inner sidewall 456, which enclose an interior cavity 460. An elongate slot 462 is provided in the inner sidewall 456. The belt 410b is threaded through the interior cavity 460 of the guide rail 446b with the outer edge 448b of the belt disposed inside the inner cavity 460, so that the belt is held within the guide rail and can slide therein. The inner portion of the belt 410, which bears the seed cup 414, extends inwardly through the slot 462.

Advantageously, the guide rails 446 have a shape and curvature that directs the endless belts 410 from the laterally spaced position at the upper end of the downwardly moveable portion 432 and draws them together to the laterally converged position of the single converged linear array 444 at the lower end of the downwardly moveable portion 432. Though not shown, a diverging siderail pair can also be provided in the lower region of the upwardly moveable portion, below the seed hopper 438, to laterally separate the seed cup arrays 412 prior to the next seed pick.

It is to be appreciated that the converging siderail configuration shown in FIGS. 16-18 is only one configuration that can be used to accomplish convergence of a pair of belts bearing linear arrays of seed cups for a converging row unit as disclosed herein. Those of skill in the art will recognize that other configurations can also be used.

It is to be understood that the above-referenced arrangements are illustrative of the application of the principles of the present invention. It will be apparent to those of ordinary skill in the art that numerous modifications can be made without departing from the principles and concepts of the invention as set forth in the claims.

What is claimed is:

1. A converging row unit for planting seed potatoes, comprising:
    a pair of linear arrays of seed cups, each array disposed upon one of first and second flexible endless belts, respectively, each belt having an upwardly moveable portion that passes through a seed pick region wherein each seed cup can draw a seed, and a downwardly moveable portion that progresses toward a combined point of discharge of the seed;
    the linear arrays being laterally spaced apart from each other in the upwardly moveable portion and converging together in the downwardly moveable portion; and
    first and second guide rails, slidingly engaging an outward edge of the downwardly moveable portion of each of the first and second endless belts, the first and second guide rails laterally directing the first and second endless belts toward each other to alternately interleave the seed cups of the pair of linear arrays into a single converged linear array within the downwardly moveable portion toward the combined point of discharge.

2. A converging row unit in accordance with claim 1, wherein:
    the pair of linear arrays have seed cups disposed at a common linear spacing; and
    the single converged linear array effectively provides about half the common linear spacing in the converged linear array.

3. A converging row unit in accordance with claim 2, wherein the common linear spacing is from about 5 inches to about 7 inches.

4. A converging row unit in accordance with claim 1, wherein:
    the first endless belt is disposed around first upper and lower pulleys, oriented in a first vertical plane;
    the second endless belt is disposed around second upper and lower pulleys, oriented in a second vertical plane that is substantially perpendicular to the first vertical plane; and
    the first and second vertical planes intersect along a line tangent to both the first and second upper and lower pulleys, the downwardly moveable portion disposed substantially along the tangent line.

5. A converging row unit in accordance with claim 1, wherein the seed pick region comprises first and second seed hoppers, configured to contain a quantity of seed, disposed around the upwardly moveable portion of the first and second linear arrays, respectively.

6. A converging row unit in accordance with claim 1, further comprising:

a frame, having wheels, configured to be moved upon ground in a planting direction;

a main seed hopper, attached to the frame, having a discharge;

a plurality of converging row units, attached to the frame adjacent to the discharge of the main seed hopper, each converging row unit configured to receive seeds from the main seed hopper and drop the seeds onto the ground below the frame; and a drive motor, attached to each converging row unit, configured to drive the endless belts of each converging row unit at a speed that is proportional to a speed of the wheeled frame in the planting direction, whereby the seeds are discharged from each converging row unit at a desired linear spacing along the ground.

7. A converging row unit in accordance with claim 1, wherein the guide rails are laterally spaced apart in an upper region of the downwardly moveable portion, and converge toward each other as the respective belt progresses downward in the downwardly moveable portion.

8. A converging row unit in accordance with claim 1, wherein the first and second guide rails further comprise:
   sidewalls enclosing an interior cavity; and
   an inner sidewall defining an elongate slot, the outward edge of each belt extending through the elongate slot and into the interior cavity.

9. A converging row unit in accordance with claim 8, further comprising a bulge, extending along the outside edge of each endless belt and contained within the interior cavity, the bulge being larger than the elongate slot, whereby the outward edge of each belt is held within the respective guide rail.

10. A converging row unit for planting seed potatoes, comprising:
    a first endless belt, having a first linear array of seed cups attached thereto at a common linear spacing;
    a second endless belt, having a second linear array of seed cups attached thereto at the common linear spacing, the first and second endless belts each having upwardly moveable portions that passes through first and second seed pick regions, wherein each seed cup can draw a seed, and downwardly moveable portions that progress to a point of discharge of the seed;
    a first guide rail, slidingly engaging an outward edge of the downwardly moveable portion of the first endless belt;
    a second guide rail, slidingly engaging an outward edge of the downwardly moveable portion of the second endless belt, the first and second guide rails laterally directing the first and second endless belts toward each other to alternately interleave the seed cups of the pair of linear arrays into a single converged linear array within the downwardly moveable portion;
    the first and second endless belts having a common travel direction and spatially converging in the downwardly moveable portion, whereby the seed cups of the first and second linear arrays become alternately interleaved together in the downwardly moveable portion to effectively provide a single converged linear array of seed cups at half the common linear spacing, extending to the point of discharge.

11. A converging row unit in accordance with claim 10, wherein:
    the first endless belt is disposed around first upper and lower pulleys, oriented in a first vertical plane;
    the second endless belt is disposed around second upper and lower pulleys, oriented in a second vertical plane that is substantially perpendicular to the first vertical plane; and
    the first and second vertical planes intersect along a line tangent to both the first and second upper and lower pulleys, the downwardly moveable portion disposed substantially along the tangent line.

12. A converging row unit in accordance with claim 10, wherein the common linear spacing is from about 5 inches to about 7 inches.

13. A converging row unit in accordance with claim 10, further comprising: first and second seed hoppers, disposed around the first and second linear arrays, respectively, configured to contain a quantity of seed, the first and second linear arrays extending vertically through the first and second seed hoppers.

14. A converging row unit in accordance with claim 10, wherein the guide rails are laterally spaced apart in an upper region of the downwardly moveable portion, and converge toward each other as the respective belt progresses downward in the downwardly moveable portion.

15. A converging row unit in accordance with claim 10, wherein the first and second guide rails further comprise:
    sidewalls enclosing an interior cavity; and
    an inner sidewall defining an elongate slot, the outward edge of each belt extending through the elongate slot and into the interior cavity.

16. A converging row unit in accordance with claim 15, further comprising a bulge, extending along the outside edge of each endless belt and contained within the interior cavity, the bulge being larger than a width of the elongate slot, whereby the outward edge of each belt is held within the respective guide rail.

17. A converging row unit in accordance with claim 10, further comprising:
    a frame, having wheels, configured to be moved upon ground in a planting direction;
    a main seed hopper, attached to the frame, having a discharge;
    a plurality of converging row units, attached to the frame adjacent to the discharge of the main seed hopper, each converging row unit configured to receive seeds from the main seed hopper and drop the seeds onto the ground below the frame; and
    a drive motor, attached to each converging row unit, configured to drive the endless belts of each converging row unit at a speed that is proportional to a speed of the wheeled frame in the planting direction, whereby the seeds are discharged from each converging row unit at a desired linear spacing along the ground.

* * * * *